US011976571B1

(12) United States Patent
White, III et al.

(10) Patent No.: US 11,976,571 B1
(45) Date of Patent: May 7, 2024

(54) MACHINABLE COATING WITH THERMAL PROTECTION

(71) Applicant: Raytheon Technologies Corporation, Farmington, CT (US)

(72) Inventors: Robert A. White, III, Meriden, CT (US); Ahmed Abdillahi Abdi, Oceanside, CA (US); David A. Litton, West Hartford, CT (US); Daniel S. Rogers, Lyman, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/080,495

(22) Filed: Dec. 13, 2022

(51) Int. Cl.
*F01D 5/28* (2006.01)

(52) U.S. Cl.
CPC ........ *F01D 5/288* (2013.01); *F05D 2300/502* (2013.01); *F05D 2300/6033* (2013.01); *F05D 2300/611* (2013.01)

(58) Field of Classification Search
CPC . F01D 9/02; F05D 2220/32; F05D 2300/6033
See application file for complete search history.

(56) References Cited

U.S. PATENT DOCUMENTS

| | | | | |
|---|---|---|---|---|
| 10,180,071 B2 * | 1/2019 | Freeman | F01D 5/18 | |
| 2016/0017721 A1 * | 1/2016 | Landwehr | F01D 5/225 | 416/189 |
| 2016/0047549 A1 * | 2/2016 | Landwehr | F01D 11/24 | 415/176 |
| 2021/0285334 A1 * | 9/2021 | Arbona | F01D 25/246 | |
| 2022/0025775 A1 * | 1/2022 | Danis | F01D 9/04 | |
| 2023/0026324 A1 * | 1/2023 | Kirby | F01D 11/08 | |

FOREIGN PATENT DOCUMENTS

| | | | | |
|---|---|---|---|---|
| BR | 112015012277 B1 * | 12/2021 | F01D 11/122 |
| DE | 102018213309 A1 * | 2/2020 | |

* cited by examiner

*Primary Examiner* — Anthony Ayala Delgado
(74) *Attorney, Agent, or Firm* — Carlson, Gaskey & Olds, P.C.

(57) ABSTRACT

A section of a gas turbine engine includes a ceramic component and a metallic component situated adjacent the ceramic component. The ceramic component and the metallic component are situated outside of a core flow path of the gas turbine engine. The section of a gas turbine engine also includes an interface between the ceramic component and a metallic component and a mullite-based coating disposed at the interface. The coating provides thermal protection to the ceramic component and the metallic component, and provides thermochemical protection against interaction between the ceramic component and the metallic component. A gas turbine engine and a method of protecting components in a gas turbine engine are also disclosed.

15 Claims, 1 Drawing Sheet

MACHINABLE COATING WITH THERMAL PROTECTION

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Various areas of the gas turbine engine include ceramic components adjacent to metallic components. The components and the interface between them may experience high temperatures during operation of the engine. In addition, due to the chemical makeup of the ceramic and metallic components, there may be unwanted chemical reactions between the two.

SUMMARY OF THE INVENTION

A section of a gas turbine engine according to an exemplary embodiment of this disclosure, among other possible things includes a ceramic component and a metallic component situated adjacent the ceramic component. The ceramic component and the metallic component are situated outside of a core flow path of the gas turbine engine. The section of a gas turbine engine also includes an interface between the ceramic component and a metallic component and a coating disposed at the interface. The coating provides thermal protection to the ceramic component and the metallic component, and provides thermochemical protection against interaction between the ceramic component and the metallic component.

In a further example of the foregoing, the coating is machinable by at least one of grinding, ultrasonic machining, water guided laser, milling, and reaming.

In a further example of any of the foregoing, the coating includes at least one of rare earth silicates, alkaline earth silicates, alkaline earth aluminosilicates, yttria-stabilized zirconia, alumina-stabilized zirconia, hafnon, zircon, yttria, mullite, titania, chromia, silicon, silicon oxides, silicon carbides, silicon oxycarbides, barium-magnesium aluminosilicate, hafnium oxides, hafnium silicon oxides, alumina-stabilized zirconia, zirconium oxides, yttrium oxides, and combinations thereof.

In a further example of any of the foregoing, the coating includes at least one of hafnon, zircon, and mullite.

In a further example of any of the foregoing, the ceramic component is a ceramic matrix composite component.

In a further example of any of the foregoing, the metallic component is an engine casing structure of the gas turbine engine.

In a further example of any of the foregoing, the ceramic component is a hook of a vane. The hook is attached to the engine casing structure. The section is a compressor section or a turbine section of the gas turbine engine.

In a further example of any of the foregoing, the ceramic component is a flange of a blade outer air seal. The flange is attached to the engine casing structure.

In a further example of any of the foregoing, the ceramic component is a nozzle liner. The nozzle liner is attached to the engine casing structure.

A gas turbine engine according to an exemplary embodiment of this disclosure, among other possible things includes a metallic engine casing structure, a ceramic component attached to the metallic engine casing structure, a coating disposed on at least one of the metallic engine casing structure and the ceramic component. The coating provides thermal protection to at least one of the ceramic component and the metallic casing structure, and provides thermochemical protection against interaction between the ceramic component and the metallic engine causing structure.

In a further example of the foregoing, the coating is machinable by at least one of grinding, ultrasonic machining, water guided laser, milling, and reaming.

In a further example of any of the foregoing, the coating includes at least one of rare earth silicates, alkaline earth silicates, alkaline earth aluminosilicates, yttria-stabilized zirconia, alumina-stabilized zirconia, hafnon, zircon, mullite, yttria, titania, chromia, silicon, silicon oxides, silicon carbides, silicon oxycarbides, barium-magnesium aluminosilicate, hafnium oxides, hafnium silicon oxides, alumina-stabilized zirconia, zirconium oxides, yttrium oxides, and combinations thereof.

In a further example of any of the foregoing, the coating includes at least one of hafnon, zircon, and mullite.

In a further example of any of the foregoing, the ceramic component is a ceramic matrix composite component.

A method of protecting components in a gas turbine engine according to an exemplary embodiment of this disclosure, among other possible things includes disposing a coating at an interface between a metallic component and a ceramic component in a gas turbine engine. The ceramic component and the metallic component are situated outside of a core flow path of the gas turbine engine. The coating provides thermal protection to the ceramic component and the metallic component, and provides thermochemical protection against interaction between the ceramic component and the metallic component.

In a further example of the foregoing, the method also includes machining the coating by at least one of grinding, ultrasonic machining, water guided laser, milling, and reaming.

In a further example of any of the foregoing, the coating includes at least one of rare earth silicates, alkaline earth silicates, alkaline earth aluminosilicates, yttria-stabilized zirconia, alumina-stabilized zirconia, hafnon, zircon, yttria, mullite, titania, chromia, silicon, silicon oxides, silicon carbides, silicon oxycarbides, barium-magnesium aluminosilicate, hafnium oxides, hafnium silicon oxides, alumina-stabilized zirconia, zirconium oxides, yttrium oxides, and combinations thereof.

In a further example of any of the foregoing, the coating includes at least one of hafnon, zircon, and mullite.

In a further example of any of the foregoing, the metallic component is a casing structure of the gas turbine engine.

In a further example of any of the foregoing, the ceramic component is a ceramic matrix composite.

DETAILED DESCRIPTION

Figure 1:
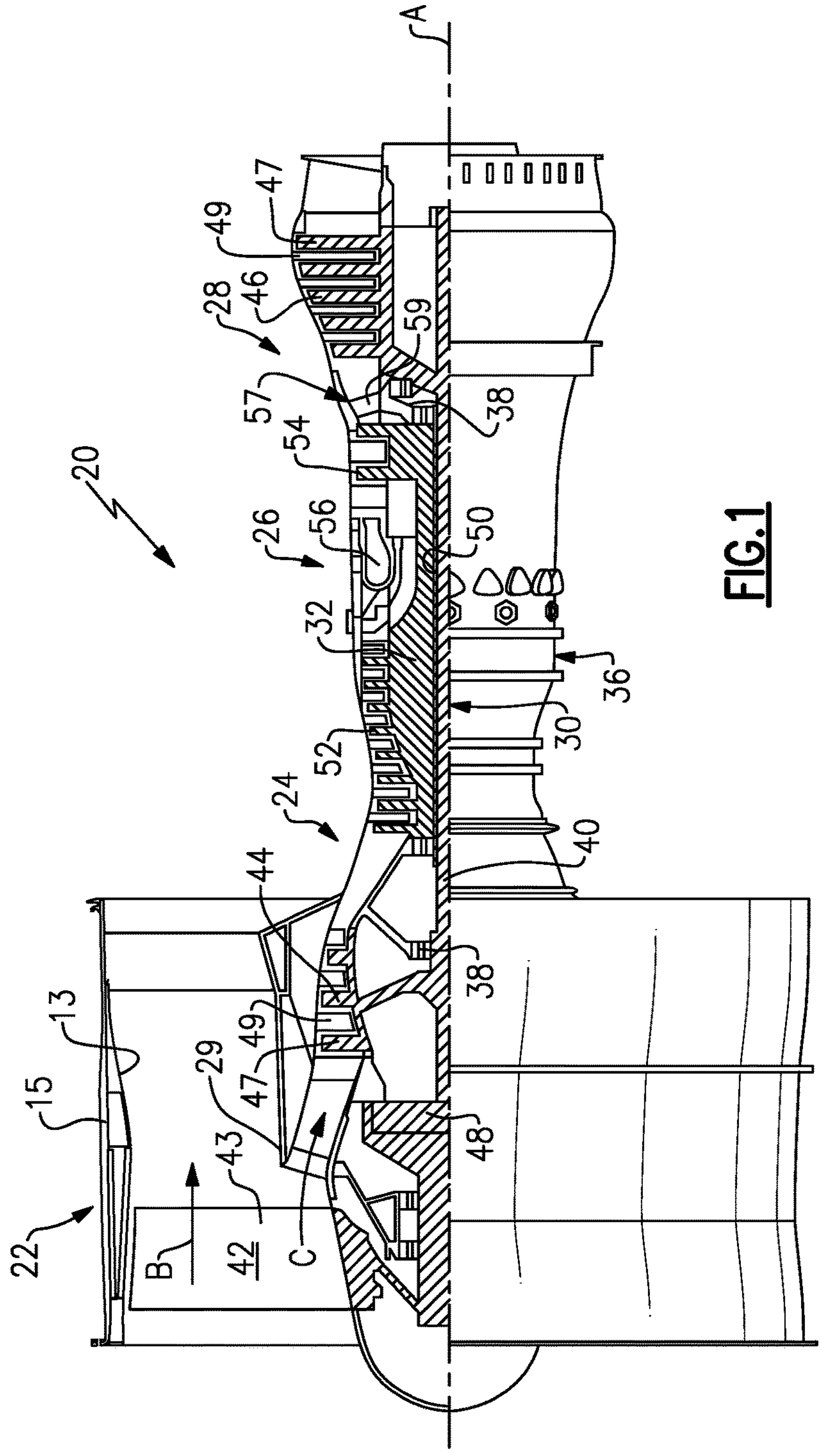
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram }^\circ \text{R})/(518.7^\circ \text{R})]^{0.5}$. The corrected fan tip speed can be less than or equal to 1150.0 ft/second (350.5 meters/second), and can be greater than or equal to 1000.0 ft/second (304.8 meters/second).

Various areas of the engine 20 include seals. For instance, the turbine section 28 may include seals between adjacent platforms of the vanes of the rows of vanes. As another example, the turbine section 28 may include seals between tips of the blades in the rows of blades and engine 20 casing structures, known as blade outer air seals or BOAS. Other examples are also contemplated.

Figure 2:
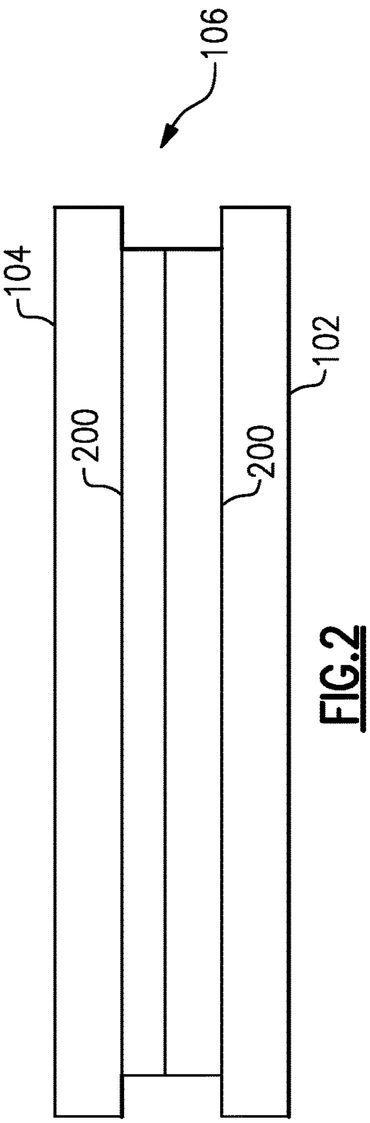
FIG. 2 schematically illustrates a ceramic component adjacent to a metallic component in the gas turbine engine of FIG. 1.

FIG. 2 schematically illustrates two components in the gas turbine engine 20. The first component 102 is a metallic component and the second component 104 is a ceramic component, such as a ceramic matrix composite. Ceramic matrix composites ("CMCs") are known in the art and will not be described in detail herein, but generally include ceramic-based reinforcements such as fibers (which may be continuous) disposed in a ceramic-based matrix material. In the case of ceramic matrix composite seals, the reinforcements can be two-dimensional/three-dimensional textiles made from unidirectional, woven, braided, knitted, or non-woven fibers. The components 102/104 are arranged adjacent one another with an interface 106 between them.

The components 102/104 can be any component of the gas turbine engine 20, but generally are not in the path of the core air flow C. One particular example, the component 102 is an engine 20 casing structure and the component 104 is a component that is attached to the engine casing structure such as a hook of a vane in the turbine section 28 or compressor section 24, a nozzle liner such as for the example nozzle discussed above, or flanges of a blade outer air seal.

Even though the components 102/104 are not in the path of the core air flow C, they experience high temperatures during operation of the engine 20. In addition, the components 102/104 may experience thermochemical reactions between one another due to their respective chemical makeups. Both the exposure to high temperatures and thermochemical reactions can degrade the components 102/104 other otherwise have undesirable effects on the longevity and/or performance of the components 102/104.

Accordingly, a machinable coating 200 is provided at the interface 106. The coating 200 can be applied to the component 102, the component 104, or both. The coating 200 provides a dual protective effect to the components 102/104. First, the coating 200 provides thermal protection to the components 102/104. In this way, the coating 200 can replace conventional thermal barrier coatings, which are often unsuitable for use with silicon-based substrates such as many CMCs. Second, the coating 200 provides thermochemical insulation to prevent chemical reactions between the components 102/104. Further, the coating 200 is amenable and forgiving to the often-grating machining operations which may otherwise be intolerable to conventional thermal barrier coatings. That is, the coating 200 is "machinable" in that it can be subject to grinding, ultrasonic machining, water guided laser, milling, reaming, or another machining method to reduce its thickness and/or smooth its surface without any adverse effects to its integrity.

Moreover, the machinable coating 200, which may be placed in, or adjacent to, a loaded attachment region of the component(s) will be more apt to manage the stresses induced by these loads in comparison to traditional thermal barrier coatings.

The coating 200 may include rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, and combinations thereof. In a particular example, the machinable coating includes at least one of hafnon, zircon, and mullite. In a more specific example, the machinable coating is a mullite-based coating, that is, it comprises at least about 50% mullite. The mullite-based coating may also include any of the foregoing constituents.

In a particular example, a silicon bond coat is disposed between the component 102/104 and the coating 200. In this example, the coating 200 is disposed on this bond coat which may have a greater affinity to bonding with the component 102/104 substrate than the coating 200 depending on the material of the component 102/104. This is particularly true for CMC components 102/104. The bond coat may likewise have a greater affinity to bonding with the material of the coating 200 than the component 102/104. This enables an improved bond between the component 102/104 and the coating 200 to ensure that the coating 200 remains intact while also mitigating potential coefficient of thermal expansion mismatches. Moreover, the bond coat itself is inert relative to CMC components 102/104 and the coat 200 to inhibit unintended formations between coating layers analogous to thermally-grown oxides (TGO) in conventional thermal barrier coatings that may result in spallation of the coating 200 and/or unanticipated changes to the coating 200 material properties.

In general, the coating 200 has a high density (for example, less than about 5% porosity).

As used herein, the term "about" has the typical meaning in the art, however in a particular example "about" can mean deviations of up to 10% of the values described herein.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A section of a gas turbine engine, comprising:

a ceramic component;

a metallic component situated adjacent the ceramic component, wherein the ceramic component and the metallic component are situated outside of a core flow path of the gas turbine engine;

an interface between the ceramic component and a metallic component; and a coating disposed at the interface, the coating providing thermal protection to the ceramic component and the metallic component, and providing thermochemical protection against interaction between the ceramic component and the metallic component, wherein the metallic component is an engine casing structure of the gas turbine engine and the ceramic component is one of a hook of a vane, the hook being attached to the engine casing structure, and wherein the section is a compressor section or a turbine section of the gas turbine engine, a flange of a blade outer air seal, the flange being attached to the engine casing structure and a nozzle liner, the nozzle liner being attached to the engine casing structure.

2. The section of claim 1, wherein the coating is machinable by at least one of grinding, ultrasonic machining, water guided laser, milling, and reaming.

3. The section of claim 1, wherein the coating includes at least one of rare earth silicates, alkaline earth silicates, alkaline earth aluminosilicates, yttria-stabilized zirconia, alumina-stabilized zirconia, hafnon, zircon, yttria, mullite, titania, chromia, silicon, silicon oxides, silicon carbides, silicon oxycarbides, barium-magnesium aluminosilicate, hafnium oxides, hafnium silicon oxides, alumina-stabilized zirconia, zirconium oxides, yttrium oxides, and combinations thereof.

4. The section of claim 3, wherein the coating includes at least one of hafnon, zircon, and mullite.

5. The section of claim 1, wherein the ceramic component is a ceramic matrix composite component.

6. The engine of claim 1, wherein the coating is machinable by at least one of grinding, ultrasonic machining, water guided laser, milling, and reaming.

7. The engine of claim 1, wherein the coating includes at least one of rare earth silicates, alkaline earth silicates, alkaline earth aluminosilicates, yttria-stabilized zirconia, alumina-stabilized zirconia, hafnon, zircon, mullite, yttria, titania, chromia, silicon, silicon oxides, silicon carbides, silicon oxycarbides, barium-magnesium aluminosilicate, hafnium oxides, hafnium silicon oxides, alumina-stabilized zirconia, zirconium oxides, yttrium oxides, and combinations thereof.

8. The engine of claim 7, wherein the coating includes at least one of hafnon, zircon, and mullite.

9. The engine of claim 1, wherein the ceramic component is a ceramic matrix composite component.

10. A gas turbine engine, comprising:

a metallic engine casing structure;

a ceramic component attached to the metallic engine casing structure;

a coating disposed on at least one of the metallic engine casing structure and the ceramic component, the coating providing thermal protection to at least one of the ceramic component and the metallic casing structure, and providing thermochemical protection against interaction between the ceramic component and the metallic engine causing structure, wherein the ceramic component is one of a hook of a vane, the hook being attached to the engine casing structure, and wherein the section is a compressor section or a turbine section of the gas turbine engine, a flange of a blade outer air seal, the flange being attached to the engine casing structure and a nozzle liner, the nozzle liner being attached to the engine casing structure.

11. A method of protecting components in a gas turbine engine, comprising:

disposing a coating at an interface between a metallic component and a ceramic component in a gas turbine engine, wherein the ceramic component and the metallic component are situated outside of a core flow path of the gas turbine engine, the coating providing thermal protection to the ceramic component and the metallic component, and providing thermochemical protection against interaction between the ceramic component and the metallic component, wherein the metallic component is an engine casing structure of the gas turbine engine and the ceramic component is one of a hook of a vane, the hook being attached to the engine casing structure, and wherein the section is a compressor section or a turbine section of the gas turbine engine, a flange of a blade outer air seal, the flange being attached to the engine casing structure and a nozzle liner, the nozzle liner being attached to the engine casing structure.

12. The method of claim 11, further comprising machining the coating by at least one of grinding, ultrasonic machining, water guided laser, milling, and reaming.

13. The method of claim 11, wherein the coating includes at least one of rare earth silicates, alkaline earth silicates, alkaline earth aluminosilicates, yttria-stabilized zirconia, alumina-stabilized zirconia, mullite, hafnon, zircon, yttria, titania, chromia, silicon, silicon oxides, silicon carbides, silicon oxycarbides, barium-magnesium aluminosilicate, hafnium oxides, hafnium silicon oxides, alumina-stabilized zirconia, zirconium oxides, yttrium oxides, and combinations thereof.

14. The method of claim 13, wherein the coating includes at least one of hafnon, zircon, and mullite.

15. The method of claim 11, wherein the ceramic component is a ceramic matrix composite.

* * * * *